(12) United States Patent
Almasmoom et al.

(10) Patent No.: US 12,410,704 B2
(45) Date of Patent: Sep. 9, 2025

(54) PREDICTING WELLBORE DIAMETERS

(71) Applicant: Saudi Arabian Oil Company, Dhahran (SA)

(72) Inventors: Salahaldeen Saleh Almasmoom, Dammam (SA); Husain Abdulhadi Alyousif, Saihat (SA)

(73) Assignee: Saudi Arabian Oil Company, Dhahran (SA)

( * ) Notice: Subject to any disclaimer, the term of this patent is extended or adjusted under 35 U.S.C. 154(b) by 107 days.

(21) Appl. No.: 18/519,939

(22) Filed: Nov. 27, 2023

(65) Prior Publication Data

US 2025/0172066 A1 May 29, 2025

(51) Int. Cl.
| | | |
|---|---|---|
| E21B 47/08 | (2012.01) | |
| E21B 47/085 | (2012.01) | |
| G01V 1/50 | (2006.01) | |
| E21B 33/13 | (2006.01) | |
| E21B 43/25 | (2006.01) | |

(52) U.S. Cl.
CPC .............. *E21B 47/085* (2020.05); *G01V 1/50* (2013.01); *E21B 33/13* (2013.01); *E21B 43/25* (2013.01)

(58) Field of Classification Search
CPC ...................................................... E21B 47/08
See application file for complete search history.

(56) References Cited

U.S. PATENT DOCUMENTS

| | | | |
|---|---|---|---|
| 5,900,733 A | 5/1999 | Wu et al. | |
| 5,963,036 A | 10/1999 | Wu et al. | |
| 7,279,677 B2 | 10/2007 | Ellis et al. | |
| 11,604,303 B2 | 3/2023 | Galford | |
| 12,147,005 B2* | 11/2024 | Hori | G01N 29/028 |
| 2002/0165670 A1 | 11/2002 | Ellis et al. | |
| 2012/0037422 A1 | 2/2012 | Rasheed | |
| 2013/0098685 A1* | 4/2013 | Collares | E21B 47/08 |
| | | | 175/40 |
| 2021/0355814 A1 | 11/2021 | Shetty et al. | |

OTHER PUBLICATIONS slb.com [online], "TerraSphere," retrieved on Jun. 25, 2024, retrieved from URL <https://www.slb.com/products-and-services/innovating-in-oil-and-gas/well-construction/measurements/logging-while-drilling-services/terrasphere-high-definition-dual-imaging-while-drilling-service>, 5 pages.

\* cited by examiner

*Primary Examiner* — William D Hutton, Jr.
*Assistant Examiner* — Avi T Skaist
(74) *Attorney, Agent, or Firm* — Fish & Richardson P.C.

(57) ABSTRACT

Drilling operations can include: drilling a wellbore in a formation; generating a synthetic diameter wellbore log for the wellbore in the formation based on estimates of wellbore diameter as a function of severity impact ratings associated with drilling activities; and completing the wellbore in the formation based at least in part on the synthetic diameter wellbore log. In some cases, one or more first wellbores are drilled with a BHA that includes a LWD ultrasonic caliper. A diameter of the first wellbores is recorded during a plurality of drilling activities with a severity impact rating assigned to each of the plurality of drilling activities based on the diameter of the first wellbores recorded during that drilling activity.

17 Claims, 7 Drawing Sheets

PREDICTING WELLBORE DIAMETERS

TECHNICAL FIELD

The present disclosure generally relates to predicting wellbore diameters.

BACKGROUND

Logging while drilling (LWD) is a technique of conveying well logging tools into the well borehole downhole as part of the bottom hole assembly (BHA). The well logging tools measure properties of the geological formation while drilling through it. Some LWD tools transmit partial or complete measurement results to the surface while still in the borehole. Complete measurement results can be downloaded from LWD tools after they are pulled out of hole. LWD tools include acoustic calipers which emit pulsed acoustic energy to image the borehole wall in the presence of opaque drilling muds.

SUMMARY

This specification describes an approach using high-resolution caliper logs from the LWD dual imaging technology identify borehole enlargements caused by drilling activity patterns. The severity of impacts on wellbore shape for each drilling activity acting on the wellbore is measured and assigned a severity impact rating. For example, the assigned severity impact ratings can be developed from the measured actual caliper logs by comparing the different measured caliper logs of wellbores while and after the drilling activities have acted on the wellbores. A formula is developed that predicts wellbore diameter as a function of the severity impact rating of the drilling activity.

This approach enables generation of a synthetic wellbore size for planned wellbores based on the planned drilling activities as well as their depths and the planned sequence of the drilling activities. This approach was tested on a formation with tight carbonate rock. High-resolution ultrasonic caliper logs were used to obtain data from six different wellbores with extended lateral sections (≥10,000 ft lateral length).

The approach described in this specification can provide one or more of the following technical advantages. This approach can provides estimates of expected damage to a planned wellbore based on the planned drilling activities. As a result, wellbore planning can be adjusted to reduce unnecessary wellbore damaging drilling practices. In particular using high resolution (e.g., 180-sector) calipers data allows characterization of the impacts of current applied drilling practices affecting wellbores being drilled. This synthetic borehole diameter will give early qualitative indicator for drilling engineers. It can be used to build several engineering applications, such as wellbore stability simulations.

The same workflow that was used to develop this synthetic wellbore diameter formula and/or severity impact can by used to develop more patterns. The real-time data from logs can be used to create relations and patterns to understand what is happening downhole. The high-definition caliper can be captured using a high-definition dual-imaging-while-drilling tool. However, the developed synthetic wellbore estimation gives an estimation of the expected damages/enlargement in the wellbore based on the expected drilling operations that are planned. It can be updated real-time. It also can be used to estimate the volume of the open hole, which is then used in planning cementing or stimulations operations without the need to run an actual caliper.

The details of one or more embodiments of these systems and methods are set forth in the accompanying drawings and the description to be presented. Other features, objects, and advantages of these systems and methods will be apparent from the description and drawings, and from the claims.

DESCRIPTION OF DRAWINGS

Like reference symbols in the various drawings indicate like elements.

DETAILED DESCRIPTION

This specification describes an approach using high-resolution caliper logs from the LWD dual imaging technology identify borehole enlargements caused by drilling activity patterns. The severity of impacts on wellbore shape for each drilling activity acting on the wellbore is measured and assigned a severity impact rating. For example, the assigned severity impact ratings can be developed from the measured actual caliper logs by comparing the different measured caliper logs of wellbores while and after the drilling activities have acted on the wellbores. A formula is developed that predicts wellbore diameter as a function of the severity impact rating of the drilling activity.

This approach enables generation of a synthetic wellbore size for planned wellbores based on the planned drilling activities as well as their depths and the planned sequence of the drilling activities. This approach was tested on a formation with tight carbonate rock. High-resolution ultrasonic caliper logs were used to obtain data from six different wellbores with extended lateral sections (≥10,000 ft lateral length).

Figure 1:
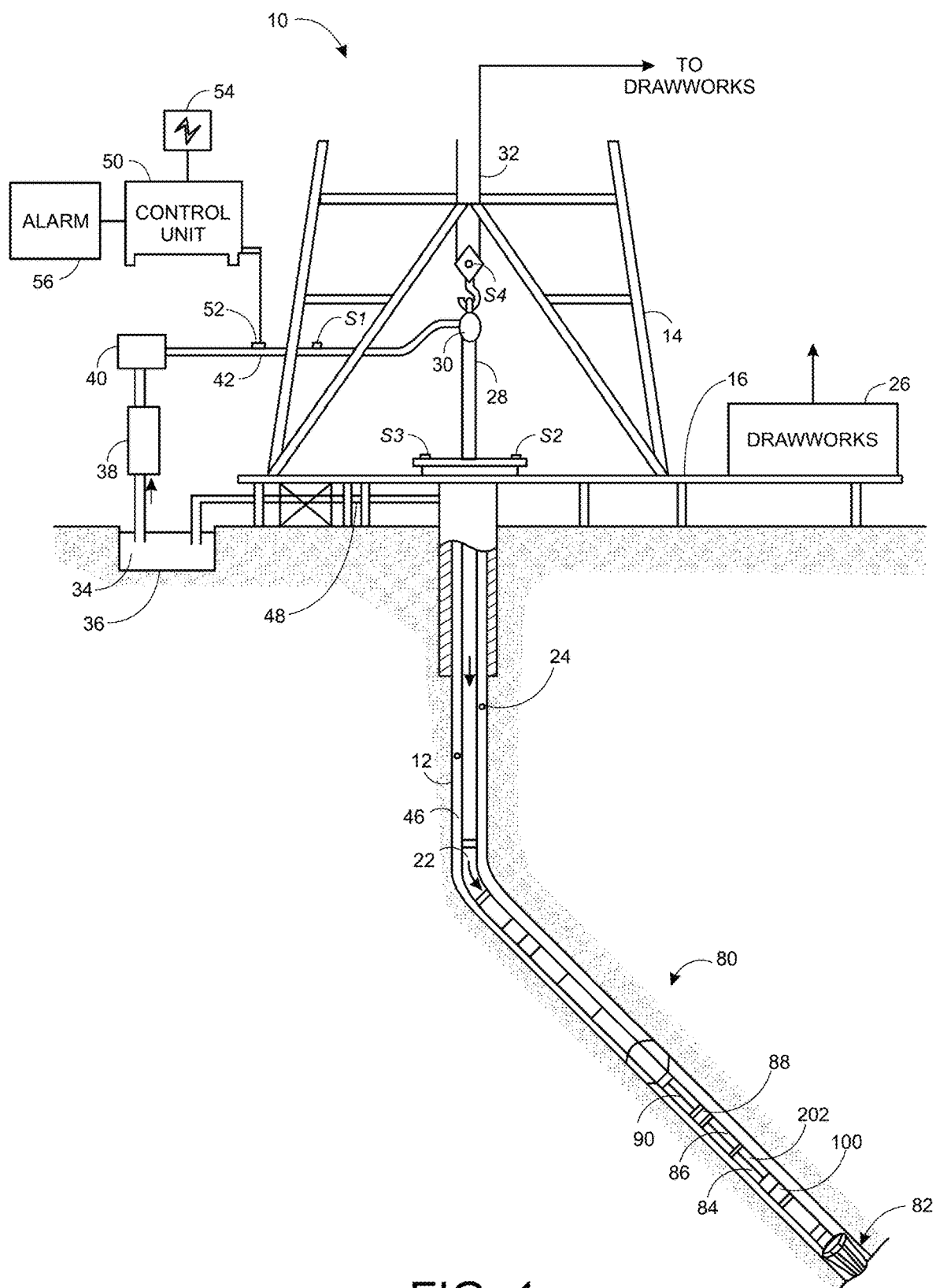
FIG. 1 is illustrates a directional wellbore being drilled using a drill string with a BHA including LWD tools.

FIG. 1 is illustrates a directional wellbore being drilled by a drilling system 10 using a drill string with a BHA 80 including LWD tools. The system 10 includes a drill string 22 with a jointed tubular string 24 extending downward from a rig 14 into the borehole 12. The drill bit 82, attached to the drill string end, is rotated to drill the borehole 12. The drill string 22 is coupled to a draw works 26 via a kelly joint 28, swivel 30 and line 32 through a pulley (not shown).

In one configuration, the BHA 80 includes a drill bit 82, a drilling motor 84, a sensor sub 86, a bidirectional communication and power module (BCPM) 88, and a formation evaluation (FE) sub 90. To enable power and/or data transfer to the other making up the BHA 80, the BHA 80 includes a power and/or data transmission line (not shown). The steering device 100 may be operated to steer the BHA 80 along a selected drilling direction by applying an appropriate tilt to the drill bit 82.

During drilling operations, a suitable drilling fluid 34 from a mud pit 36 is circulated under pressure through a channel in the drill string 22 by a mud pump 34. The drilling fluid passes from the mud pump 38 into the drill string 22 via a desurger 40, fluid line 42 and Kelly joint 28. The drilling fluid 34 is discharged at the borehole bottom through an opening in the drill bit 82. The drilling fluid 34 circulates uphole through the annular space 46 between the drill string 22 and the borehole 12 and returns to the mud pit 36 via a return line 48. The drilling fluid acts to lubricate the drill bit 82 and to carry borehole cutting or chips away from the drill bit 82. A sensor S1 typically placed in the line 42 provides information about the fluid flow rate. A surface torque sensor S2 and a sensor S3 associated with the drill string 22 respectively provide information about the torque and rotational speed of the drill string 22. Additionally, sensor S4 associated with line 29 is used to provide the hook load of the drill string 22.

A surface controller 50 receives signals from the downhole sensors and devices via a sensor 52 placed in the fluid line 42 and signals from sensors S1, S2, S3, hook load sensor S4 and other sensors used in the system The sensor sub 86 includes a ultrasonic caliper in addition to other sensors.

The bidirectional data communication and power module ("BCPM") 88 transmits control signals between the BHA 80 and the surface as well as supplies electrical power to the BHA 80. For example, the BCPM 88 provides electrical power to the steering device 100 and establishes two-way data communication between the processor 202 and surface devices such as the controller 50. In one embodiment, the BCPM 88 generates power using a mud-driven alternator (not shown) and the data signals are generated by a mud pulser (not shown). In addition to mud pulse telemetry, other suitable two-way communication links may use hard wires (e.g., electrical conductors, fiber optics), acoustic signals, EM or RF. Of course, if the drill string 22 includes data and/or power conductors (not shown), then power to the BHA 80 may be transmitted from the surface.

Figure 2:
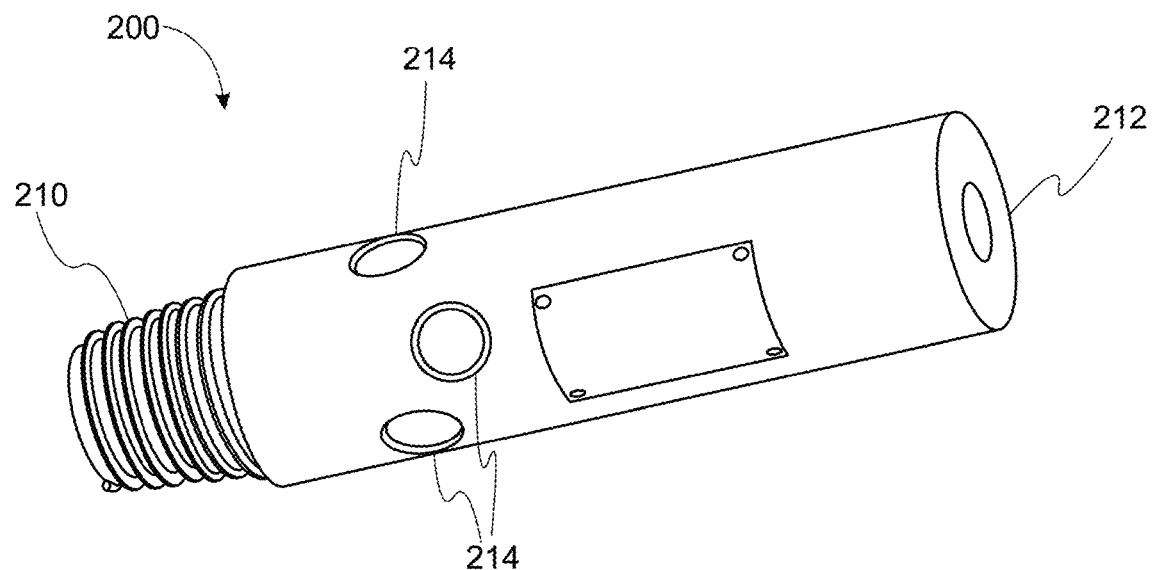
FIG. 2 is a perspective view of an LWD ultrasonic caliper.

FIG. 2 is a perspective view of an LWD ultrasonic caliper 200. The caliper 200 extends from a first end 210 to a second end 212. The first end is threaded for attachment to other components of the BHA and the second end 212 includes a nozzle which provides a channel for drilling fluid. Three ultrasonic transducers 214 are embedded in the sides of the tool housing at an angle. The tool electronics care installed inside the tool housing. One appropriate caliper is the high-definition dual-imaging-while-drilling tool (TerraSphere) commercially available from SLB (https://www.slb.com/).

The transducers transmit ultrasonic waves and receive echoes through the acoustic windows on the tool housing. Typically, the transducers 214 embedded are operated in pulse-echo mode to reduce the number of transducers required. Short bursts of acoustic energy are emitted by rotating transducers. The acoustic energy travels through the drilling mud and is partially reflected at the borehole wall back to the transducer. The amplitudes of the reflected pulses form the basis of the acoustic image of the borehole wall. The resolution of the acoustic image depends on the number of sectors in caliper with more sectors providing higher resolution.

For example, some high-resolution calipers include four ultrasonic sensors (transducers, pulse echo measurements). The transducers scan over wellbore shape as the tool is rotated around by sending a voltage pulse and receiving it back from the formation. The difference in the travel time (pulse to be received back) is recorded. Every sensor rotates 360 degrees and scans the wellbore shape. The sensors are capable of taking a reading every certain number of degrees. For example, 16-sector sensors take a reading every 22.5 degrees. In contrast, 180-sector sensors have been developed to take a reading every 2 degrees. By scanning the wellbore shape, different features such as fractures, formation boundaries, scratches, and breakouts (enlargement) can be seen. The more readings, the better to catch the features between the readings (sectors). At one point, the ultrasonic sensors can take up to 180 readings. In terms of distance when the tool moved downwards, the distance between readings is 0.2 inches.

Figure 3A:
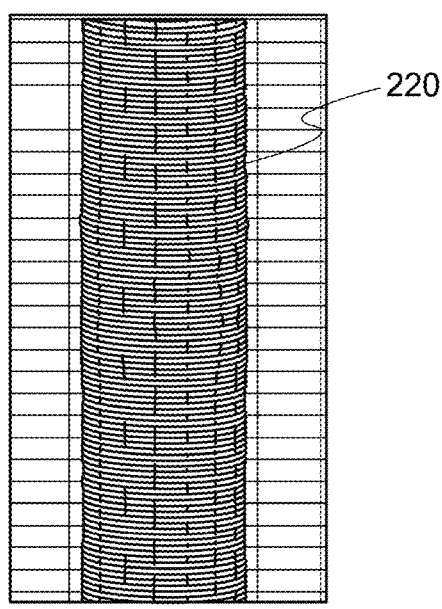
FIG. 3A is an example 16-sector caliper log and FIG. 3B is an example 180-sector caliper log.
Figure 3B:
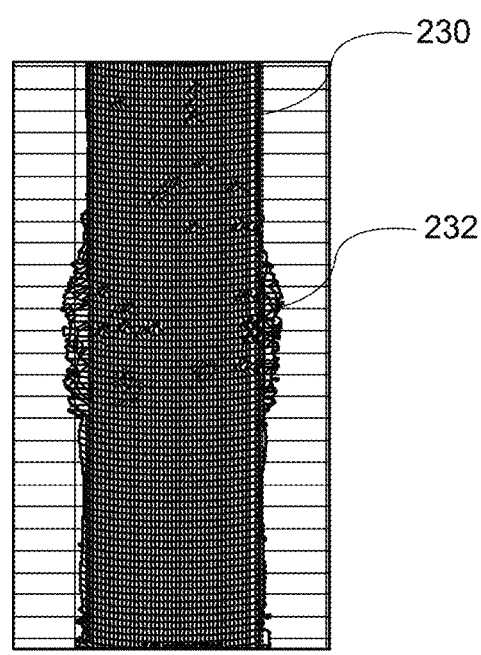

FIG. 3A is an example 16-sector ultrasonic caliper log 220 and FIG. 3B is an example 180-sector ultrasonic caliper log 230. These logs were generated at the same location in the same wellbore. In the example, a 180-sector caliper used four ultrasonic sensors take 180 readings at a certain point while rotated every 0.2 inches. These readings are either transmitted real-time, or stored and retrieved at surface when the tool is pulled out of the wellbore. The transmitted data can be the collected samples can be processed with different number of sectors up to the maximum of 180 sectors. The same collected samples can be processed with 16 sectors and more up to a maximum of 180 sectors. However, the 180 sectors will take longer to process and require larger space to store when transmitted to surface. Comparing these two caliper logs illustrates the importance of high resolution. In particular, the 180-sector high-resolution caliper log 230 (see FIG. 3B) reveals 1-foot wellbore washout 232. This washout was not detected with the lower resolution 16-sector caliper log 220 (see FIG. 3A).

The processed high-resolution caliper logs provide a direct relationship between the drilling parameters applied and the wellbore trajectory (changes in direction while drilling the curve/lateral sections) to the resultant wellbore shapes (and in turn the tortuosity level in the wellbores). The processed logs also demonstrate the effects of the different bottom hole assemblies (BHA) configurations, and how the different drilling modes affect the wellbore shape and tortuosity. Understanding the effects of the drilling processes can also allow differentiation between the drilling induced shape artifacts and the geological causes for borehole tortuosity changes. In particular, the high-resolution caliper data can measure the very minor, very short wellbore enlargement features in the wellbore, and can measure the actual affected wellbore diameter even if the difference is very small.

Figure 4:
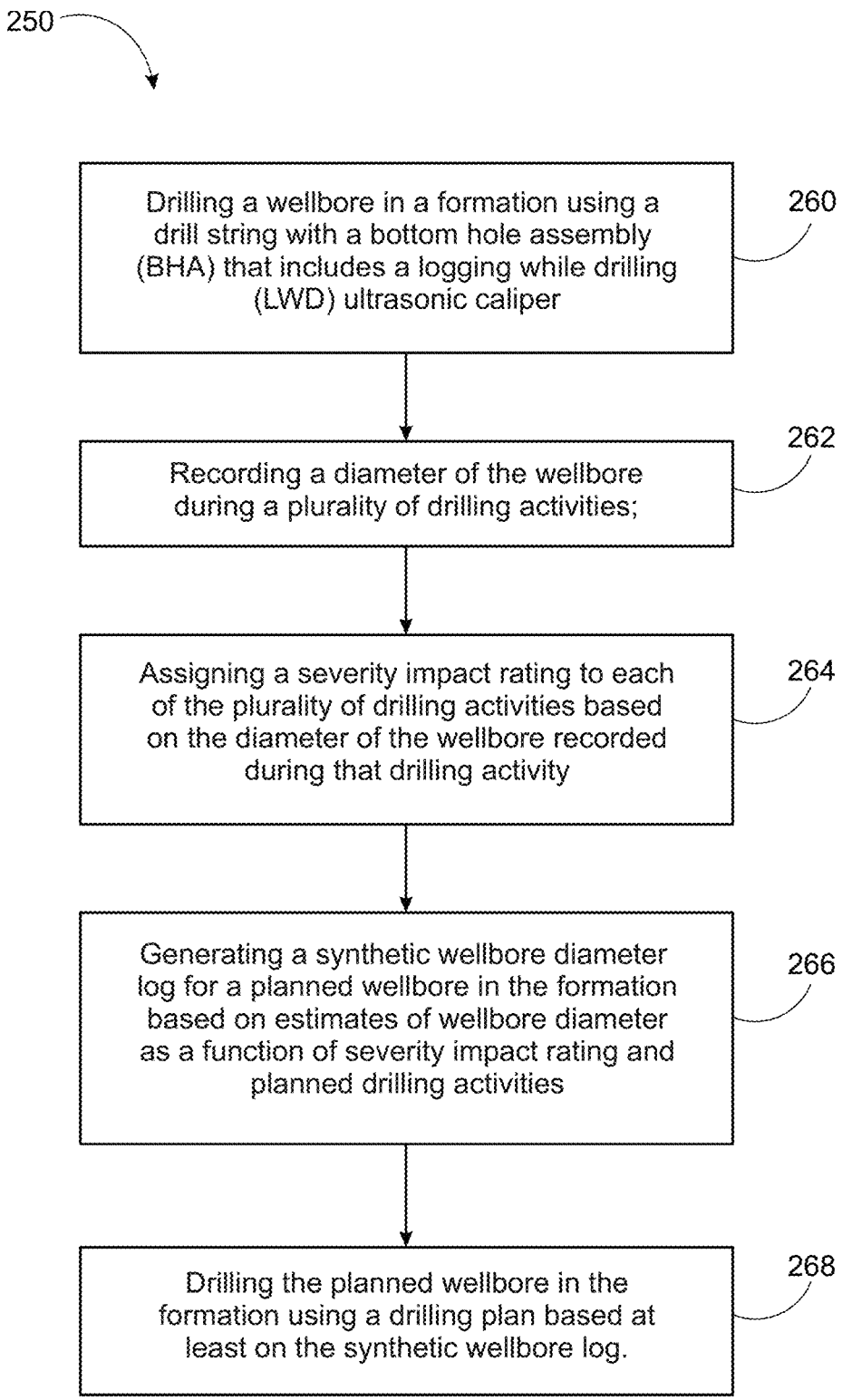
FIG. 4 is a flow chart of a method generating synthetic caliper logs.

FIG. 4 is a flow chart of a method 250 of planning drilling operations. The synthetic wellbore gives an estimation of the expected damages/enlargement in the wellbore based on the expected drilling operations that are planned. It can be updated in real-time. It also can be used to estimate the volume of the open hole, which is then used in planning cementing or stimulations operations without the need to run an actual caliper. A number of initial wellbores (i.e., first wellbores) are drilled in a reservoir. These initial wellbores are wellbores drilled for purposes including, for example, exploration and production but, for this discussion are characterized as initial wellbores because they are also used to generate the data necessary to implement the method 250. The initial wellbores are drilled in a formation using a drill string with a BHA that includes a LWD ultrasonic caliper (step 260). The method 250 requires information from at least one initial well but is preferably implemented using information from multiple wellbores.

During drilling, LWD ultrasonic caliper is used to record the diameter of the wellbore during various drilling activities (step 262). This method was successfully tested using an LWD ultrasonic caliper with 180 sectors.

Based on time and other records, the diameter of the wellbore can be correlated with drilling activities taking place at the time of recording. The correlated diameter and drilling activity logs are examined to assign a severity impact rating to each of the drilling activities based on the diameter of the wellbore recorded during that drilling activity (step 264). For example, the average actual diameter of the wellbore is calculated from the caliper log after the wellbore got affected by the activity. The actual value is compared with the synthetic value that is calculated based on the developed formula to cross-check the accuracy. Through trial-and-error through trying different values to get an average wellbore diameter to match the actual diameter, the severity impact values were assigned and related to each drilling activity.

The severity impact values assigned were developed based on high-resolution caliper data recorded across tight carbonate rock. For any other type of rock, the severity impact values might be different. In one implementation, the severity impact rating will be assigned based, at least in part, on an average percentage increase in recorded wellbore diameter during one of the plurality of drilling activities. For example, severity impact rating of each drilling activity can be increased by 1 for each percent increase in wellbore diameter recorded during the associated drilling activity.

The severity impact ratings are used as the basis for generating a synthetic wellbore diameter log for a planned wellbore in the formation based on estimates of wellbore diameter as a function of severity impact rating and planned drilling activities (266). This approach provides relationships that are most directly relevant when the drilled wellbore and the planned wellbore have the same nominal diameter and are being drilled in the same formation. However, it is anticipated that relationships developed based on caliper logs measured in drilling a wellbore of one diameter can be effectively applied to drilling wellbores of another. Similarly, it is anticipated that relationships developed for one formation can be applied to other similar formations.

The initially proposed well drilling plan can be adjusted based on the synthetic wellbore diameter log. After the drilling plan is finalized, the planned wellbore can be drilled in the formation a drilling plan based at least on the synthetic wellbore log (step 268).

The method 250 was tested using six initial wells. The recorded LWD actual 180-sector high-resolution processed caliper logs in six extended lateral sections (≥10,000 ft) through tight carbonate formation were analyzed. Oil-based mud was drilling fluid environment for the six laterals The wellbore diameter for the six laterals are 8.5 inches. The LWD recorded the caliper logs continuously while performing different drilling activities such as drilling the section, making connections, working the drill string with rotation and circulation in 90-ft intervals to condition the wellbore, backreaming out of the wellbore, and reaming into the wellbore. A LWD downhole caliper was installed in the drilling BHA and some cleanout BHA after the section was already drilled. The 3-D wellbore shapes for these wellbores were generated from the recorded LWD 180-sector ultrasonic caliper data while the different drilling activities were acting on the wellbore.

In five (5) wellbores, the LWD dual-density tool was part of the drilling BHA. Therefore, the caliper logs are recorded while conducting the drilling activities associated with drilling the lateral sections which included drill ahead; downlink at the same and different depths, rotation at the same depth with pumps off or on, stationary without rotation at the same depth with pumps off or on, stationary without rotation at the same depth with pump on, stop drilling with pumps off, stop drilling with pumps on, make connections, stick and slip, shocks and vibrations, and working drilled stands before making connections with pumps on and rotation. In the sixth well, the LWD dual-density tool was part of the wellbore conditioning BHA. Therefore, the caliper logs are recorded while conducting the drilling activities associated with cleaning and conditioning the already drilled wellbore which included: rotation at the same depth with pumps off or on; stationary without rotation at the same depth with pumps off or on; stationary without rotation at the same depth with pump on; ream up the drilled lateral; ream down the drilled lateral; time lapse≥24-36 hours (e.g., POOH to surface); and time lapse≤24 hours (e.g. short trip to previous shoe).

Studying the wellbore shapes identified correlations between the different drilling activities and their impact on the resultant wellbore shape. To link the actual wellbore diameters developed from the LWD caliper logs with the different drilling activities acting on the wellbore, the severity of each drilling activity was measured. This was done by evaluating the resultant average actual inner diameter of the wellbore and associate it with the simultaneously occurring drilling activity. Depending on the severity (how big the inner diameter of the wellbore was), the drilling activity acting on the wellbore was assigned a number representing the level of the impact. The severity impact number assigned ranged from zero (0) for no impact to ten (10) for the highest impact.

Figure 5:
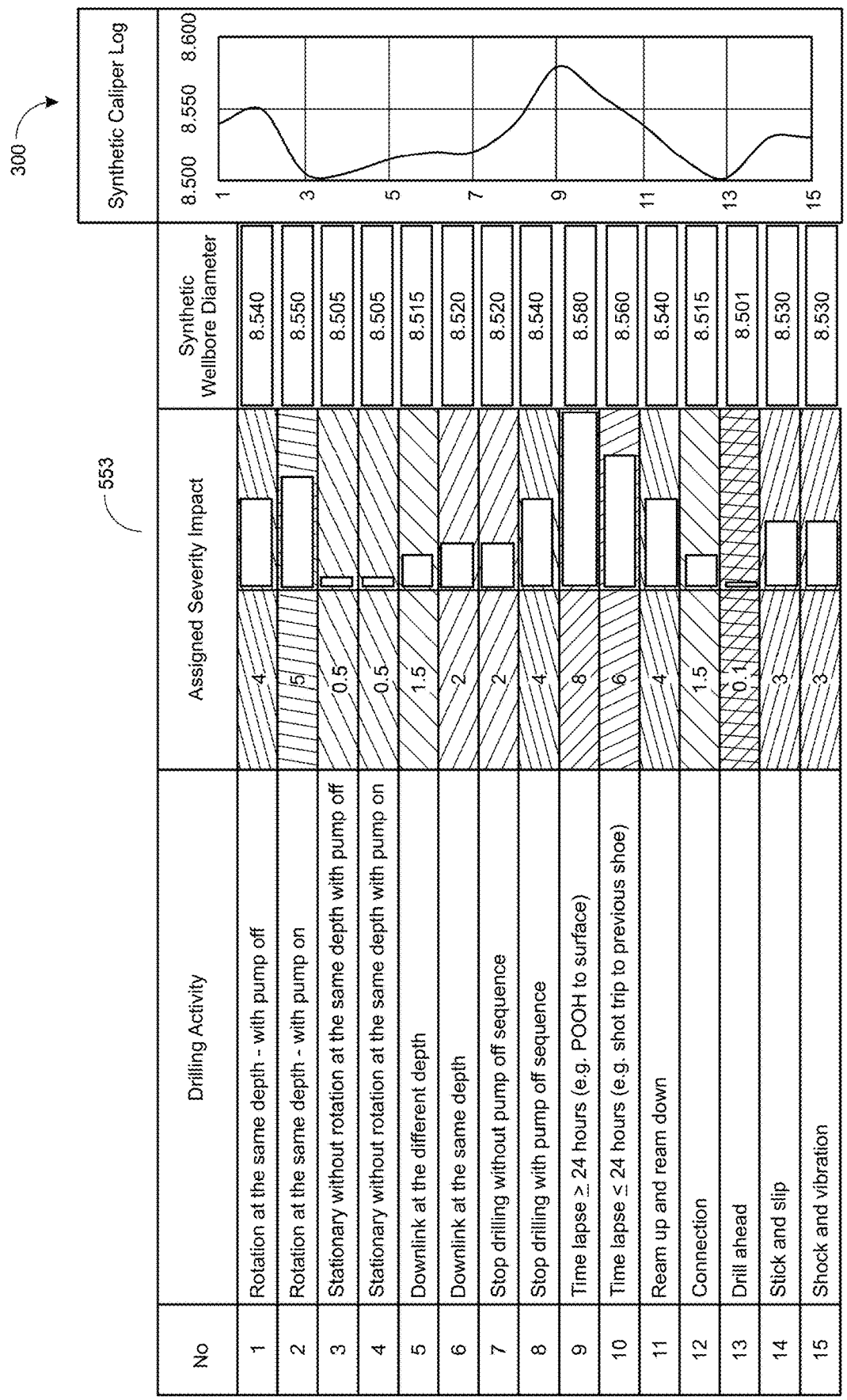
FIG. 5 is an example of a log linking drilling activities with the severity of their impact on the wellbore shape.

FIG. 5 is an example of a table linking drilling activities with the severity of their impact on the wellbore shape. The table shows the assigned severity impact level of fifteen different drilling activities acting on the wellbore. These impact level values are for tight carbonate rock since the study was done on it. It is assumed that the assigned severity impact values will be very close if not the same for other types of rocks. However, the same method can be applied for other types of rocks if the high-resolution LWD caliper logs are available or are generated.

The total wellbore caliper logs of the lateral sections were measured. Drilling ahead drilling activity, and time lapse after the wellbore is already drilled affect the whole lateral section being considered. However, the remaining drilling activities act on the wellbore at certain depths. Some (e.g., like rotation at the same depth, shocks and vibrations, and downlinking) affect a short interval as they are associated with non-productive time, or the need to change the wellbore direction. Some (e.g., reaming up the lateral to allow the BHA to be pulled out the drilled wellbore) affect longer intervals of the wellbore.

The drilling activities impact on the wellbore shape was linked with the actual wellbore shape measured from the 180-sector caliper logs by integrating the severity impact into calculating the synthetic caliper log. The severity impact term was integrated into a formula to calculate the synthetic wellbore shape. The formula created based on relationship between diameter and severity impact (built from actual observations from the six wells). Based on severity of the impact of each drilling operation recorded in drilled well, the average actual diameter of the wellbore was calculated from the caliper log after the wellbore was affected by the activity. The actual value was compared with the synthetic value that is calculated based on the developed formula to cross-check the accuracy. Formula (1) developed to compute the synthetic caliper was $$D' = D + \left(D \times \frac{s}{n}\right) \quad (1)$$

where D'=Synthetic caliper wellbore diameter (wellbore size/inner diameter); D=original wellbore size (inner diameter)–for the six cases studies, the original wellbore size is 8.5"; s=severity impact rating, and n=formation coefficient.

The coefficient n was developed using the actual 180-sector caliper logs from the studied six laterals in tight carbonate rock. A coefficient n value of 100 gave the closest wellbore size to the actual recorded wellbore sizes from the high-resolution caliper logs. A formation coefficient of n=100 will be used for the tight carbonate rock using oil-based mud as a drilling fluid environment.

The same methodology might be used for developing a synthetic wellbore size for different types of rock if the 180-sector caliper logs are available. Different formation coefficients can be assigned to the based on the actual wellbore caliper logs. Moreover, the severity impact assigned values can be verified for other types of rocks or if a different drilling fluid system is used. Similarly upgrades in equipment and/or technologies such as bit design, mud additives, and directional drive may reduce the severity impact level of some drilling activities and require new relationships be developed using the method 250.

FIG. 5 also includes a synthetic wellbore diameter log 300 reflecting the assigned severity impact ratings. The table illustrates the developed severity impact ratings from the actual caliper logs after studying the impact of the different drilling activates on the wellbore. The synthetic wellbore diameter calculated using Formula (1) is included.

Figure 6:
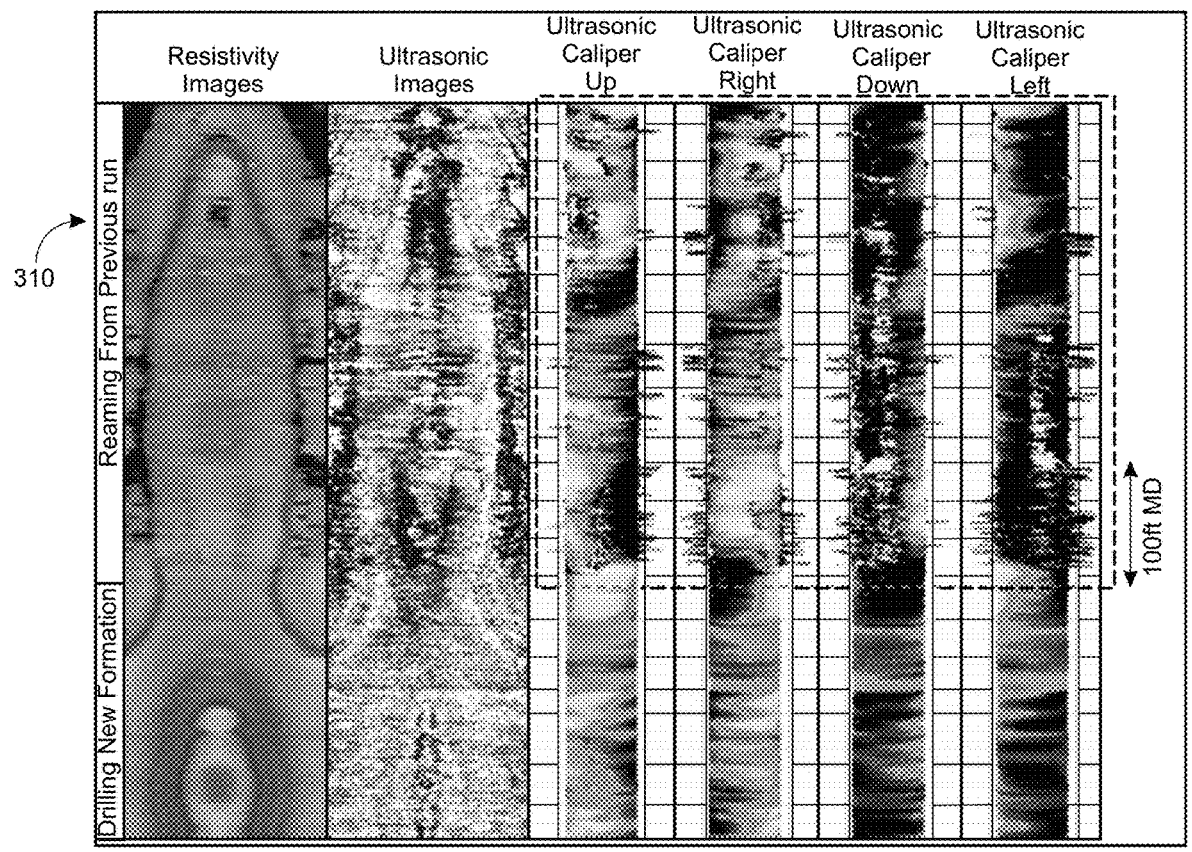
FIGS. 6 and 7 are images of well logs.
Figure 7:
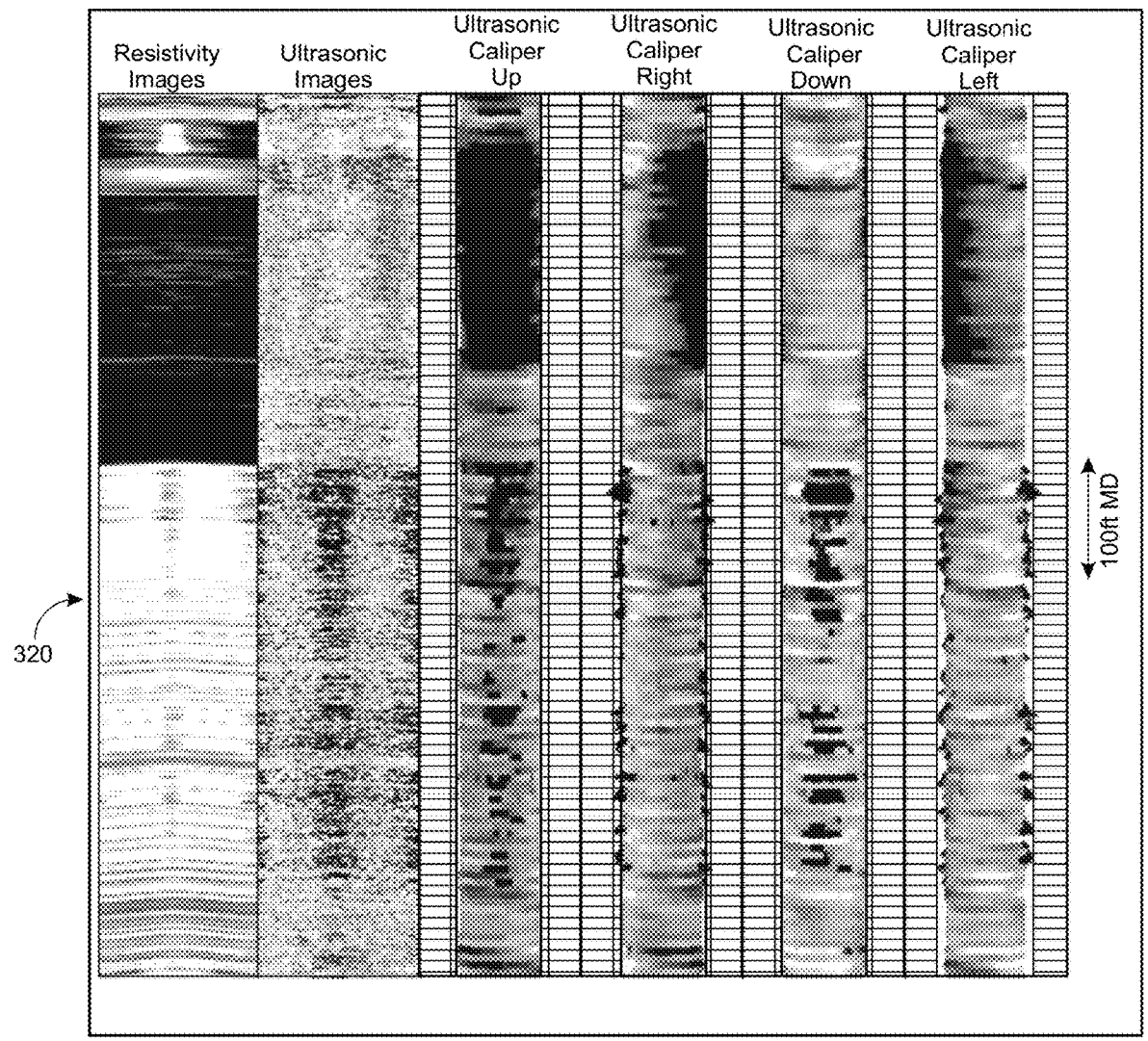

FIGS. 6 and 7 are images of well logs taken during the test of the method. FIG. 6 shows an image 310 of the log generated by re-logging done after the wellbore has been open for approximately 96 hours. Reaming and re-logging was done to fill the missing image data. Caliper data indicates severe washouts. Accordingly, this activity is assigned a high severe impact level. FIG. 7 shows an image 320 of the log associated with high shocks and vibrations from the RSS tool experienced while drilling this 100 ft interval. The wellbore shape has medium damage at the area of the shocks and vibrations.

Figure 8:
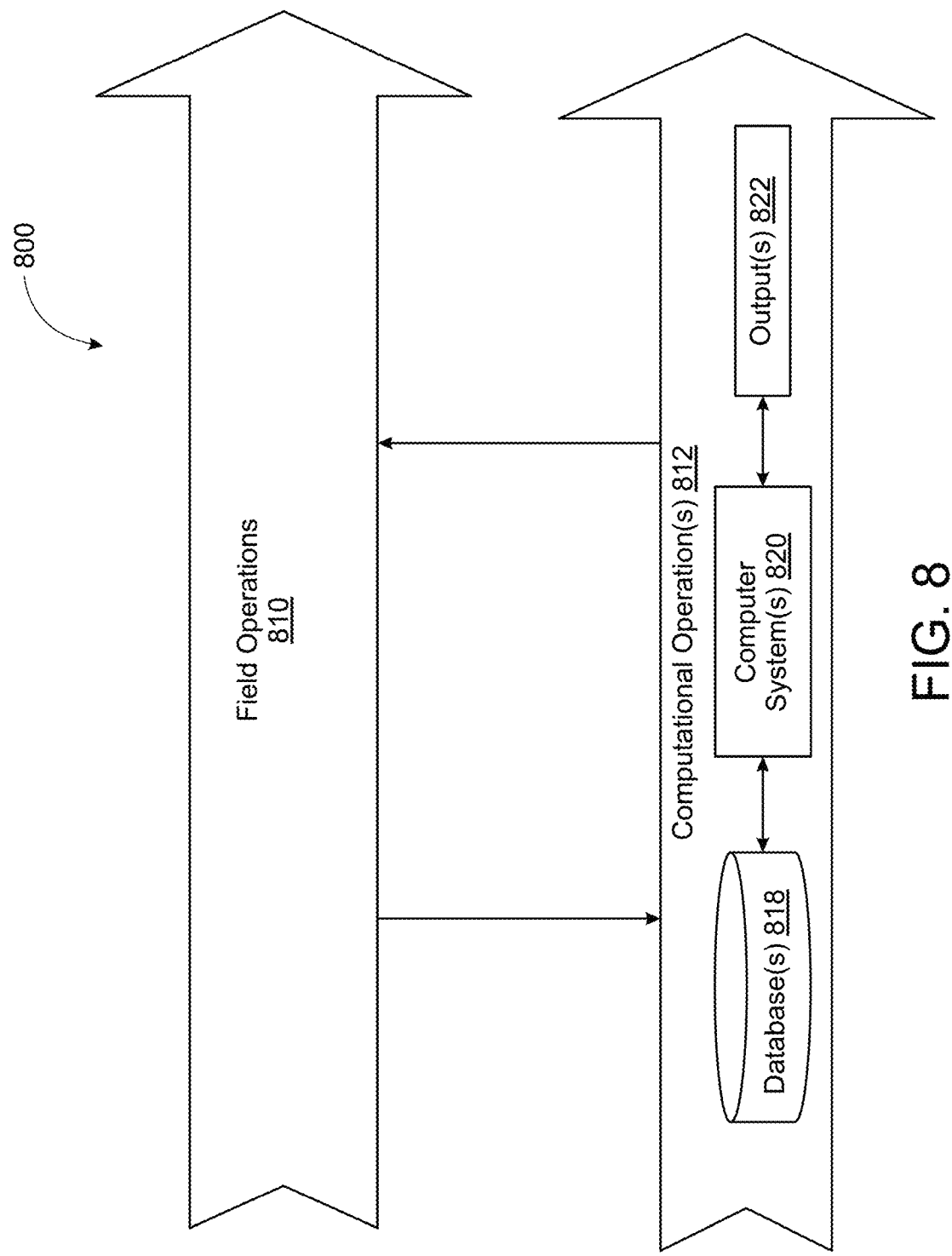
FIG. 8 illustrates hydrocarbon production operations that include both field operations and computational operations, which exchange information and control exploration for the production of hydrocarbons.

FIG. 8 illustrates hydrocarbon production operations 800 that include both one or more field operations 810 and one or more computational operations 812, which exchange information and control exploration for the production of hydrocarbons. In some implementations, outputs of techniques of the present disclosure can be performed before, during, or in combination with the hydrocarbon production operations 800, specifically, for example, either as field operations 810 or computational operations 812, or both.

Examples of field operations 810 include forming/drilling a wellbore, hydraulic fracturing, producing through the wellbore, injecting fluids (such as water) through the wellbore, to name a few. In some implementations, methods of the present disclosure can trigger or control the field operations 810. For example, the methods of the present disclosure can generate data from hardware/software including sensors and physical data gathering equipment (e.g., seismic sensors, well logging tools, flow meters, and temperature and pressure sensors). The methods of the present disclosure can include transmitting the data from the hardware/software to the field operations 810 and responsively triggering the field operations 810 including, for example, generating plans and signals that provide feedback to and control physical components of the field operations 810. Alternatively or in addition, the field operations 810 can trigger the methods of the present disclosure. For example, implementing physical components (including, for example, hardware, such as sensors) deployed in the field operations 810 can generate plans and signals that can be provided as input or feedback (or both) to the methods of the present disclosure.

Examples of computational operations 812 include one or more computer systems 820 that include one or more processors and computer-readable media (e.g., non-transitory computer-readable media) operatively coupled to the one or more processors to execute computer operations to perform the methods of the present disclosure. The computational operations 812 can be implemented using one or more databases 818, which store data received from the field operations 810 and/or generated internally within the computational operations 812 (e.g., by implementing the methods of the present disclosure) or both. For example, the one or more computer systems 820 process inputs from the field operations 810 to assess conditions in the physical world, the outputs of which are stored in the databases 818. For example, seismic sensors of the field operations 810 can be used to perform a seismic survey to map subterranean features, such as facies and faults. In performing a seismic survey, seismic sources (e.g., seismic vibrators or explosions) generate seismic waves that propagate in the earth and seismic receivers (e.g., geophones) measure reflections generated as the seismic waves interact with boundaries between layers of a subsurface formation. The source and received signals are provided to the computational operations 812 where they are stored in the databases 818 and analyzed by the one or more computer systems 820.

In some implementations, one or more outputs 822 generated by the one or more computer systems 820 can be provided as feedback/input to the field operations 810 (either as direct input or stored in the databases 818). The field operations 810 can use the feedback/input to control physical components used to perform the field operations 810 in the real world.

For example, the computational operations 812 can process the seismic data to generate three-dimensional (3D) maps of the subsurface formation. The computational operations 812 can use these 3D maps to provide plans for locating and drilling exploratory wells. In some operations, the exploratory wells are drilled using logging-while-drilling (LWD) techniques which incorporate logging tools into the drill string. LWD techniques can enable the computational operations 812 to process new information about the formation and control the drilling to adjust to the observed conditions in real-time.

The one or more computer systems 820 can update the 3D maps of the subsurface formation as information from one exploration well is received and the computational operations 812 can adjust the location of the next exploration well based on the updated 3D maps. Similarly, the data received from production operations can be used by the computational operations 812 to control components of the production operations. For example, production well and pipeline data can be analyzed to predict slugging in pipelines leading to a refinery and the computational operations 812 can control machine operated valves upstream of the refinery to reduce the likelihood of plant disruptions that run the risk of taking the plant offline.

In some implementations of the computational operations 812, customized user interfaces can present intermediate or final results of the above-described processes to a user. Information can be presented in one or more textual, tabular, or graphical formats, such as through a dashboard. The information can be presented at one or more on-site locations (such as at an oil well or other facility), on the Internet (such as on a webpage), on a mobile application (or app), or at a central processing facility.

The presented information can include feedback, such as changes in parameters or processing inputs, that the user can select to improve a production environment, such as in the exploration, production, and/or testing of petrochemical processes or facilities. For example, the feedback can include parameters that, when selected by the user, can cause a change to, or an improvement in, drilling parameters (including drill bit speed and direction) or overall production of a gas or oil well. The feedback, when implemented by the user, can improve the speed and accuracy of calculations, streamline processes, improve models, and solve problems related to efficiency, performance, safety, reliability, costs, downtime, and the need for human interaction.

In some implementations, the feedback can be implemented in real-time, such as to provide an immediate or near-immediate change in operations or in a model. The term real-time (or similar terms as understood by one of ordinary skill in the art) means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second(s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

Events can include readings or measurements captured by downhole equipment such as sensors, pumps, bottom hole assemblies, or other equipment. The readings or measurements can be analyzed at the surface, such as by using applications that can include modeling applications and machine learning. The analysis can be used to generate changes to settings of downhole equipment, such as drilling equipment. In some implementations, values of parameters or other variables that are determined can be used automatically (such as through using rules) to implement changes in oil or gas well exploration, production/drilling, or testing. For example, outputs of the present disclosure can be used as inputs to other equipment and/or systems at a facility. This can be especially useful for systems or various pieces of equipment that are located several meters or several miles apart, or are located in different countries or other jurisdictions.

EXAMPLES

In an example implementation, methods for drilling operations include: drilling one or more first wellbores in a formation using a drill string with a bottom hole assembly (BHA) that includes a logging while drilling (LWD) ultrasonic caliper; recording a diameter of the first wellbores during a plurality of drilling activities; assigning a severity impact rating to each of the plurality of drilling activities based on the diameter of the first wellbores recorded during that drilling activity; drilling a second wellbore in the formation; generating a synthetic diameter wellbore log for the second wellbore in the formation based on estimates of wellbore diameter as a function of severity impact ratings; and completing the second wellbore in the formation based at least in part on the synthetic diameter wellbore log.

In an aspect combinable with the example implementation, the synthetic diameter wellbore log is generated as the second wellbore is being drilled. In some cases, parameters of drilling operations are adjusted during drilling based on the synthetic diameter wellbore log. In some cases, the parameters of drilling operations being adjusted includes at least one of drilling rate, direction of drilling, or rotation of the drill string.

In another aspect combinable with any of the previous aspects, completing the second wellbore in the formation based at least in part on the synthetic diameter wellbore log comprises performing cementing operations based at least in part on the synthetic diameter wellbore log.

In another aspect combinable with any of the previous aspects, completing the second wellbore in the formation based at least in part on the synthetic diameter wellbore log comprises performing stimulation operations based at least in part on the synthetic diameter wellbore log.

In another aspect combinable with any of the previous aspects, the LWD ultrasonic caliper has at least 100 sectors. In some cases, the LWD ultrasonic caliper has between 160 and 200 sectors.

In another aspect combinable with any of the previous aspects, assigning the severity impact rating comprises assigning the severity impact rating based at least in part on an average percentage increase in recorded wellbore diameter during one of the plurality of drilling activities. In some cases, assigning the severity impact rating for each of the plurality of drilling activities comprises increasing the severity impact rating of each of the plurality of drilling activities by 1 for each percent increase in wellbore diameter recorded during the associated drilling activity.

In another aspect combinable with any of the previous aspects, the first wellbores and the second wellbore have the same nominal diameter.

In another aspect combinable with any of the previous aspects, drilling and recording are performed while drilling a plurality of second wellbores in the formation. In some cases, assigning a severity impact rating to each of the plurality of drilling activities based on the diameter of the wellbore recorded during that drilling activity for the first wellbores.

A number of embodiments of these systems and methods have been described. Nevertheless, it will be understood that various modifications may be made without departing from the scope of this disclosure. Accordingly, other embodiments are within the scope of the following claims.

What is claimed is:

1. A method for drilling operations, the method comprising:
   drilling one or more first wellbores in a formation using a drill string with a bottom hole assembly (BHA) that includes a logging while drilling (LWD) ultrasonic caliper;
   recording a diameter of the first wellbores during a plurality of drilling activities;
   assigning a severity impact rating to each of the plurality of drilling activities based on an increase in wellbore diameter during the associated drilling activity;
   drilling a second wellbore in the formation;
   generating a synthetic diameter wellbore log for the second wellbore in the formation based on synthetic wellbore diameters calculated as a function of the severity impact ratings and the diameter of the first wellbores; and completing the second wellbore in the formation based at least in part on the synthetic diameter wellbore log.

2. The method of claim 1, wherein the synthetic diameter wellbore log is generated as the second wellbore is being drilled.

3. The method of claim 2, wherein parameters of drilling operations are adjusted during drilling based on the synthetic diameter wellbore log.

4. The method of claim 3, wherein the parameters of drilling operations being adjusted includes at least one of drilling rate, direction of drilling, or rotation of the drill string.

5. The method of claim 1, wherein completing the second wellbore in the formation based at least in part on the synthetic diameter wellbore log comprises performing cementing operations based at least in part on the synthetic diameter wellbore log.

6. The method of claim 1, wherein completing the second wellbore in the formation based at least in part on the synthetic diameter wellbore log comprises performing stimulation operations based at least in part on the synthetic diameter wellbore log.

7. The method of claim 1, wherein the LWD ultrasonic caliper has at least 100 sectors.

8. The method of claim 7, wherein the LWD ultrasonic caliper has between 160 and 200 sectors.

9. The method of claim 1, wherein assigning the severity impact rating for each of the plurality of drilling activities comprises increasing the severity impact rating of each of the plurality of drilling activities by 1 for each percent increase in wellbore diameter recorded during the associated drilling activity.

10. The method of claim 1, wherein the first wellbores and the second wellbore have the same nominal diameter.

11. The method of claim 1, wherein drilling and recording are performed while drilling a plurality of second wellbores in the formation.

12. The method of claim 11, wherein assigning a severity impact rating to each of the plurality of drilling activities based on the diameter of the wellbore recorded during that drilling activity for the first wellbores.

13. A method for drilling operations, the method comprising:
    drilling a wellbore in a formation;
    recording a diameter of a wellbore during a plurality of drilling activities;
    assigning a severity impact rating to each of the plurality of drilling activities based on an increase in wellbore diameter during the associated drilling activity;
    generating a synthetic diameter wellbore log for the wellbore in the formation based on synthetic wellbore diameters calculated as a function of the severity impact ratings and the diameter of the wellbore; and
    completing the wellbore in the formation based at least in part on the synthetic diameter wellbore log.

14. The method of claim 13, wherein the synthetic diameter wellbore log is generated as a second wellbore is being drilled.

15. The method of claim 14, wherein parameters of drilling operations are adjusted during drilling based on the synthetic diameter wellbore log.

16. The method of claim 13, further comprising completing a second wellbore in the formation based at least in part on the synthetic diameter wellbore log, wherein completing the second wellbore comprises performing cementing operations based at least in part on the synthetic diameter wellbore log.

17. The method of claim 13, further comprising completing a second wellbore in the formation based at least in part on the synthetic diameter wellbore log, wherein completing the second wellbore comprises performing stimulation operations based at least in part on the synthetic diameter wellbore log.

* * * * *